Patented Oct. 4, 1949

2,483,806

UNITED STATES PATENT OFFICE 2,483,806

WATERPROOF CONCRETE COMPOSITION

Walter D. Buckley, Berkeley, and Paul E. McCoy, San Francisco, Calif., assignors, by mesne assignments, to Stancal Asphalt & Bitumuls Company, San Francisco, Calif., a corporation of Delaware No Drawing. Application September 18, 1946, Serial No. 697,834

10 Claims. (Cl. 106—96)

This invention relates to emulsions, more particularly, to bituminous emulsions, of the oil-in-water type which are especially adapted for use in making waterproof Portland cement-type concretes, gypsum plasters, and the like.

This invention also relates to the art of preparing waterproof Portland cement-type concretes, gypsum plasters, and the like.

In the art of making concretes of the Portland cement type, wherein a mixture of Portland cement or other hydraulic cement, aggregate and water is prepared and allowed to set, it is an object long sought to provide means of rendering the concrete waterproof without impairing the mechanical strength of the concrete. It is similarly an object long sought to provide means of rendering gypsum plasters and the like waterproof without substantially impairing the mechanical strength of the same.

One means of preparing waterproof concretes, gypsum plasters and the like is to incorporate in the wet mix a small amount of bituminous material or other suitable water-insoluble, thermoplastic material, usually of the order of about ½ to 2½% based on the total weight of wet mix. The bituminous or other like material is generally used in emulsified form, being dispersed in water, and many emulsions are available for this purpose. Typical of such emulsions are so-called mixing-type asphalt emulsions, such as pass the cement mixing test of ASTM D-631. These asphaltic emulsions contain about 50 to 70 parts by weight of asphalt and about 50 to 30 parts by weight of water, together with a small proportion of emulsifying agent and stabilizing agent. Such emulsions are generally rather highly alkaline, having a pH above 9, frequently as high as 11 or 12. Such emulsions, however, while effective to waterproof concretes, plasters and the like and to impart thereto resilience and other desirable properties, in nearly all cases cause a substantial impairment of mechanical strength of the concrete, plaster or the like, once it has set and cured.

It is an object of the present invention to provide new and useful emulsions of water-insoluble, thermoplastic organic materials.

It is a further object of the invention to provide new and useful emulsions of bituminous materials.

It is a particular object of the invention to provide emulsions of water-insoluble, thermoplastic organic materials which are capable of admixture with the ingredients of the Portland cement-type mixes and gypsum plaster mixes without breakdown, and which do not impair substantially the mechanical strength of the cured concrete or plaster.

It is a further particular object of the invention to provide bituminous emulsions which are capable of admixture with the ingredients of Portland cement-type mixes and gypsum plaster mixes without breakdown, and which do not impair substantially the mechanical strength of the cured concrete or plaster.

It is a still further object of the invention to provide concretes of the Portland cement type, gypsum plasters and the like which are characterized by waterproofness, resilience and substantially unimpaired mechanical strength.

These and other objects of the invention will be apparent from the ensuing description and the appended claims.

In accordance with the invention, oil-in-water type emulsions of water-insoluble, thermoplastic organic materials are prepared and are rendered stable against breakdown on admixture with Portland cement and fine aggregates, by including therein a small amount of a certain purified lignin product described in detail hereinbelow.

The materials emulsified in accordance with the invention are exemplified by petroleum asphalt, natural asphalt, paraffin waxes, coal tars, coal tar pitches, stearine pitch, ester gum, and thermoplastic synthetic resins such as polyvinyl acetates, polyvinyl chlorides and copolymers of vinyl acetate and vinyl chloride. Also, latices of synthetic and natural rubber may be stabilized in accordance with the invention. Preferably, however, the material emulsified is a bituminous material of petroleum origin such as petroleum asphalt, natural asphalt and paraffin wax. Of these preferred materials, petroleum asphalt is most advantageously used, and it may be produced by steam refining, by air blowing, by solvent extraction methods, etc., or by a combination of such methods. Asphalts of zero to 300 penetration (ASTM method D5-25) and 90 to 225° F. melting point (ring and ball method) are suitable; also, road oils and cutbacks.

These materials may be emulsified by methods well known in the art, as exemplified by the following methods of emulsifying asphalt.

Certain asphalts from California crudes are emulsifiable in hot, dilute aqueous caustic alkali by the method of Montgomerie, U. S. Patent No. 1,643,675 or Braun, U. S. Patent No. 1,737,491. The emulsions so produced are quick-breaking or penetration emulsions; that is, they break quickly on contact with mineral aggregates and, as usually prepared, also undergo not less than 60% demulsification on mixing with 35 ml. of 0.02 N calcium chloride solution in accordance with ASTM D244 specification. Similar emulsions can be prepared from asphalts which are not emulsifiable in caustic alkali solution, by incorporating in the alkaline solution a small amount, usually about 0.1 to 0.5% based on emulsion of a suitable emulsifying agent such as oleic acid, Swedish rosin oil, a petroleum insoluble solvent-extracted resin from pine wood or alkali metal soaps thereof, as described in detail in Buckley U. S. Patent No. 2,256,886 and hereinafter referred to as "pine wood resin."

In accordance with one embodiment of the invention, quick-breaking or penetration emulsions of petroleum asphalt, natural asphalt, paraffin wax and the like are prepared as described above, and these quick-breaking emulsions are rendered stable against breakdown on admixture with Portland cement and fine mineral aggregates, by incorporating therein a small amount, usually 0.25 to 2% based on weight of emulsion, of the aforesaid lignin material.

Alternatively, the stable, mixing type emulsion may be prepared in a single step by emulsifying hot, molten asphalt or the like in a hot aqueous caustic alkali solution containing dispersed therein the said lignin material. In such case the alkali solution preferably also contains an emulsifying agent, such as saponified oleic acid, Swedish rosin oil or pine wood resin, in the amount of 0.1 to 0.5% based on weight of emulsion; and the lignin material is used in the amount of 0.25 to 2% based on weight of emulsion.

The hot, molten asphalt and hot, aqueous solution containing caustic alkali, emulsifying agent and the lignin material may be supplied simultaneously to a colloid mill. By this method, it is even possible to produce emulsions from an asphalt of the Mid-Continent type (containing substantially no saponifiable material) and an aqueous caustic alkali solution of the lignin material, without the aid of an additional emulsifying agent; the lignin material serves both as emulsifying and stabilizing agent. But emulsions so made are inferior to those made as above described, in which are present both an emulsifying agent (such as saponified rosin oil or saponification products of materials naturally present in the asphalt) and the lignin material. A coaction occurs between the emulsifying agent and the lignin material, the former serving to produce a fine grained emulsion and the latter to stabilize the emulsion.

Emulsions thus made will have a pH above 9 frequently as high as 11 or 12. Preferably, the pH is reduced, as by adding boric or acetic acid, to about 9. Better mixing emulsions are thus produced.

We have further discovered that, if the pH of our emulsions is reduced even more, to about 7.5 or less, the emulsions are very greatly improved with respect to qualities adapting them for use with Portland cement mixes, gypsum plaster mixes and the like. These low pH emulsions have the remarkable property of imparting to Portland cement concretes, gypsum plasters and the like the qualities usually associated with such emulsions (i. e., waterproofness, resilience, etc.) without imparing substantially the mechanical strength of the same. Indeed, in many cases, the mechanical strength is actually increased.

The pH is preferably lowered to 6 to 7.5, but it may be lowered to 4 or less; the minimum being dictated by stability of the emulsions, since if the emulsion is rendered too strongly acid, it will be rendered unstable.

pH adjustment may be accomplished in various ways, but preferably as follows: The pH is first brought down to 9 or 10 (if it is initially above such figures) by adding to the emulsion a weak acid such as boric acid, oxalic acid or acetic acid, after which the pH is lowered to the desired range by adding a stronger acid such as 10% hydrochloric acid, phosphoric or sulfuric acid.

The lignin material employed in accordance with the invention to render the emulsion capable of admixture with Portland cement and fine aggregates without breakdown, is a refined by-product of the sulfate process of pulping cellulosic materials, such as pine wood. In this sulfate process, which is described in detail in standard works on the subject, such as Sutermeister's Chemistry of Pulp and Paper Making, pages 94 to 134 (3rd ed., John Wiley and Sons, 1941), wood chips are treated with an aqueous sodium sulfide solution. Lignin materials dissolve in the sulfide solution and, after removal of the pulp (which is used in making paper), are contained in the so-called "black liquor." This black liquor may then be treated with acids to lower the pH, resulting in precipitation of water-insoluble lignin material and separation thereof from water-soluble materials such as sugars. It is this precipitate from sulfate black liquors, suitably purified, which constitutes the lignin material employed in accordance with the invention.

The lignin material contemplated by the present invention and its properties are described in a copyrighted (1945) and widely distributed publication of the West Virginia Pulp and Paper Co., being Bulletin L-1, entitled, "Indulin—Lignin from Pine Wood." As set forth in said publication, the lignin therein described exists in two forms, one being the disodium salt of the other. Hereinafter, throughout this application, the lignin described in said publication will be referred to as "Lignin I" and its disodium salt as "Lignin I, Form C," such terms being coined terms for the purposes of this application.

Lignin I is a brown, free-flowing amorphous powder, soluble in aqueous caustic alkali, insoluble in water and aqueous acid solutions. It contains 65% carbon, 5% hydrogen and 30% oxygen. It is considered to be a polymer of many homogeneous units, each unit having a molecular weight of about 840 and containing four methoxyl groups, four or more hydroxyl groups and perhaps one carbonyl group. It can be readily etherified, esterified, nitrated, mercurated and halogenated. It reacts readily with phenols, amines, aldehydes, sulfur, sulfides and sulfites. On alkaline fusion or pressure hydrogenation, aromatic materials are produced.

Analyses of typical samples of Lignin I and Lignin I, Form C have shown the following additional properties:

|  | Lignin I | Lignin I, Form C |
| --- | --- | --- |
| Solubility in water | Nil | Soluble |
| pH, 10% solution or suspension | 3.1 | 9.7 |
| Ash_____per cent__ | 0.54 | 11.5 |
| Al as $Al_2O_3$_____do____ | trace | 1.02 |
| Ca as CaO_____do____ | trace | 0.14 |
| Sulfate as $Na_2SO_4$_____do____ | 0.28 | 3.10 |

Lignin I or Lignin I, Form C, or other forms of purified lignin derived from sulfate liquors and characterized by water-insolubility (when in the acidic, un-neutralized form) and alkali-solubility, are incorporated in the emulsions of the invention by procedures such as those described above. Preferably, the Lignin I or its equivalent is first dispersed in water.

If the Lignin I is in the form of a water-soluble salt, it is merely necessary to dissolve it in water. On the other hand, if the Lignin I is in a water-insoluble form, it may be necessary to dissolve it in aqueous caustic alkali. Lignin I may, however, be added directly to an alkaline emulsion or to alkaline water used to make the emulsion.

The following specific examples will serve further to illustrate the practice and advantages of the invention:

Example 1.—A quick-breaking asphalt emulsion prepared by emulsifying 57 parts by weight of hot 50/60 penetration California asphalt in 43 parts by weight of hot 0.35% aqueous caustic soda, was treated thus: 1 part by weight of Lignin I was dissolved in 2.1 parts by weight of 1.2% aqueous caustic soda solution. To 95 parts by weight of the above quick-breaking emulsion were added 3.1 parts by weight of the above Lignin I solution and 1.9 parts by weight of a 16% aqueous boric acid solution. To another portion of the same quick-breaking emulsion, 94 parts by weight, were added 4 parts by weight of a 25% aqueous solution of Lignin I, Form C and 1.9 parts by weight of a 16% aqueous boric acid solution.

Inspections on these emulsions were as follows:

Table I

| | Emulsion+ Lignin I | Emulsion+ Lignin I, Form C |
|---|---|---|
| Residue | 55.4 | 55.4 |
| Viscosity | 22.8 | 28.6 |
| Cement test | pass | pass |
| pH | 9.1 | 9.4 |
| Sieve test, 20 mesh | trace | trace |
| Sieve test, 40 mesh | few shot | few shot |
| Dehydration | 0.291 | 0.326 |
| Settlement, 5 days | +0.4 | +0.4 |

The viscosity, sieve and settlement tests were those of ASTM D244–40 specifications; the cement test was that of ASTM D244–41T specifications; and the dehydration test was that described in ASTM Technical Bulletin No. 101, page 34.

Example 2.—Emulsions were prepared from various asphalts, according the following formula and method: 57 parts by weight of molten asphalt and 43 parts by weight of a hot aqueous solution containing a small amount of a mixture of Swedish rosin oil and pine wood resin, caustic soda, Lignin I, Form C and bentonite clay, were charged to a colloid mill in the proportions indicated. pH of the emulsions so produced was lowered by addition of boric acid to about 9.5 and then, by addition of 10% HCl solution, to about 7.

The asphalts used were a Mid-Continent asphalt, a West Texas asphalt and a California asphalt. The finished emulsions had residues of about 56 and viscosities ranging from about 20 to 60, and all passed the cement test and were characterized by high dehydration (about 0.6 to 0.8).

Example 3.—Concrete mixes were made in the conventional manner from Portland cement, concrete sand and water. The emulsions of Example 2 were added to several of the mixes. Water, in addition to that contained in the emulsions, was added to give a slump value, as determined by ASTM D143–39, of 1½ to 1¾ inches.

The mixes were cast into cylinders, cured and tested for compression strength. Formulae of the mixes and compression strengths were as given in Table II, below:

Table II

| | Untreated Mix | Emulsion A | Emulsion B | Emulsion C |
|---|---|---|---|---|
| Concrete sand (parts by volume) gallons | 3.0 | 3.0 | 3.0 | 3.0 |
| Portland cement (parts by volume) do | 1.0 | 1.0 | 1.0 | 1.0 |
| Water (parts by volume) cubic centimeter | 3,000 | 2,420 | 2,330 | 2,150 |
| Emulsion (parts by volume) gallons | Nil | 0.2 | 0.2 | 0.2 |
| Slump inches | 1½ | 1½ | 1¾ | 1¾ |
| Compressive strength, p. s. i., 7 days curing (average of 3 specimens) | 2,370 | 1,790 | 1,950 | 2,310 |
| Compressive strength, p. s. i., 28 days curing (average of 3 specimens) | 3,090 | 3,050 | 3,080 | 3,620 |

It will be noted that 7 day curing strengths were somewhat less in the case of some of the treated concretes than in the case of the untreated concrete. However, the 28 day strengths of the treated concretes were as great as or greater than the strengths of the untreated concrete. Thus, the emulsions of the invention in some cases retard early development of strength (although not nearly as much as other emulsions) but do not impair or actually increase permanent strength. Other emulsions greatly impair permanent strength.

Emulsions of the invention have also been used to waterproof gypsum wallboard. Gypsum wallboard is ordinarily made as follows: Gypsum is ground and calcined to produce the hemi-hydrate, $CaSO_4 \cdot 1/2H_2O$. The calcined gypsum is mixed with a lightening agent such as sawdust, soap or starch, or with a mixture of such materials. A small amount of gypsum may also be added to the mixture to accelerate crystallization of the calcined gypsum. Then 100 parts by weight of the dry ingredients are mixed with 80 parts by weight of water to produce a mix of heavy pancake batter consistency, which is spread between plies of lightly sized paper. About 12 parts of water combine with (hydrate) the calcined gypsum and the remaining 68 parts, more or less, of water are removed by drying the board in a kiln to a water content of 1½ mols of water per molecule of calcium sulfate.

This procedure is conventional and, insofar as the present invention is concerned, may be varied.

The emulsions of the invention, when added with or after the water during the mixing procedure above described, have the effect of greatly improving waterproofness of the finished board without diminishing substantially the mechanical strength of the same. Indeed, the emulsion frequently increases the mechanical strength, as shown by the data of Table III, below:

Table III

| | Tensile strength of air-dry board | Water resistance of air-dry board |
|---|---|---|
| | P. s. i. | |
| Untreated gypsum plaster | 239 | 1 sec. |
| Gypsum plaster treated with emulsion of invention | 287 | 55 minutes. |

The plaster samples were made substantially as described above, but without enclosing in paper.

Water resistance was determined by placing a droplet of water of standard size on the plaster sample and observing the time required for the water to disappear into the sample.

By way of contrast, other emulsions of the same asphalt, similarly prepared and, judged by the conventional asphalt emulsion tests (such as mixing properties, settlement, etc.), equivalent to the emulsion of the invention, reduced the mechanical strength considerably and in some cases did not waterproof the plaster nearly as effectively.

Where emulsions of the invention are used to waterproof Portland cement concretes and other types of hydraulic cement concrete, they are preferably used in such amounts as to incorporate ½ to 2½ of asphalt (or such other dispersed material as may be used) based on total weight of wet mix. Where similarly used in gypsum plasters and the like, the emulsion may be used in amounts such as to incorporate about 2½ to 15%, preferably about 5 to 8%, of asphalt (or other dispersed material) based on total weight of wet mix.

In general, where emulsions of the invention are added to Portland cement concrete mixes, gypsum plaster mixes and the like, the amount of water added to the mix will be diminished by the amount of water contained in the emulsion.

We claim:

1. A freely flowing, full mixing, non-fermentable, non-grainy oil-in-water type emulsion capable of admixture with fine aggregates without breakdown, comprising 50–70% by weight of water-insoluble, water-dispersible high molecular weight, thermoplastic organic material dispersed in 20–50% by weight of water and containing about 0.25–2.0% by weight of a high molecular weight substantially pure lignin derivative of waste sulfate black liquor, said substantially pure lignin derivative being water-insoluble; soluble in aqueous caustic solutions; substantially free of ash, water-soluble alkali metal salts and low molecular weight organic compounds; said emulsion having a pH of about 4.0–7.5.

2. The composition of claim 1 having a pH of about 6–7.5.

3. The composition of claim 1 in which the dispersed phase of the emulsion is asphalt and is present in the emulsion in an amount about 56–60% by weight of the emulsion.

4. A material of construction comprising a set, cured mixture of mineral aggregate, a setting agent selected from the group consisting of a Portland type hydraulic cement and gypsum plaster, and water, said mixture containing about 0.5–15% by weight of a freely flowing, full mixing, non-fermentable, non-grainy oil-in-water type emulsion capable of admixture with fine aggregates without breakdown, comprising 50–70% by weight of water-insoluble, water-dispersible high molecular weight, thermoplastic organic material dispersed in 20–50% by weight of water and containing about 0.25–2.0% by weight of a high molecular weight substantially pure lignin derivative of waste sulfate black liquor, said substantially pure lignin derivative being water-insoluble; soluble in aqueous caustic solutions; substantially free of ash, water-soluble alkali metal salts and low molecular weight organic compounds; said emulsion having a pH of about 4.0–7.5, said material of construction having a 28-day compressive strength not substantially less than the 28-day compressive strength of said material without said emulsion.

5. The composition of claim 4 in which the dispersed phase of said emulsion is asphalt.

6. The composition of claim 4 in which the emulsion has a pH of 6–7.5.

7. The composition of claim 4 in which the dispersed phase of the emulsion is a bituminous material comprising about 56–60% the emulsion.

8. A method of preparing a freely flowing, full mixing, non-fermentable, non-grainy, oil-in-water type emulsion capable of admixture with fine aggregates without breakdown, comprising emulsifying about 50–70% by weight of the emulsion of a water-insoluble, water-dispersible, high molecular weight, thermoplastic organic material in about 20–50% by weight of the emulsion of alkaline water and incorporating in the emulsion about 0.25–2.0% by weight of the emulsion of a high molecular weight, substantially pure lignin derivative of waste sulfate black liquor, said substantially pure lignin derivative being water insoluble; soluble in aqueous caustic solution; substantially free of ash, water-soluble alkali metal salts, and low molecular weight organic compounds; reducing the pH of said emulsion to about 9–10 with an aqueous solution of a weak acid and then further lowering the pH to about 4.0–7.5 with an aqueous solution of a strong acid.

9. The process of claim 8, wherein the dispersed phase of the emulsion is asphalt.

10. The process of claim 8, wherein the dispersed phase of the emulsion is asphalt, the weak acid is boric acid and the strong acid is hydrochloric acid.

WALTER D. BUCKLEY.
PAUL E. McCOY.

REFERENCES CITED

The following references are of record in the file of this patent:

UNITED STATES PATENTS

| Number | Name | Date |
|---|---|---|
| 2,132,607 | Davis | Oct. 11, 1938 |
| 2,355,180 | Remy | Aug. 8, 1944 |
| 2,399,411 | Watts et al. | Apr. 30, 1946 |